United States Patent [19]
Rizzi et al.

[11] 3,746,489
[45] July 17, 1973

[54] APPARATUS FOR INJECTING MOLDING REINFORCED PLASTIC ARTICLES

[75] Inventors: Marc A. Rizzi, Orange; Peter Hold, Milford; Dominic A. D'Amato, Cheshire, all of Conn.; Dario J. Ramazzotti, Tallmadge, Ohio

[73] Assignee: USM Corporation, Boston, Mass.

[22] Filed: Dec. 28, 1970

[21] Appl. No.: 101,791

[52] U.S. Cl............................... 425/205, 425/204
[51] Int. Cl............................................... B29f 3/02
[58] Field of Search................... 18/30 FM, 30 FG, 18/30 FH, 30 FQ, 30 FS, 30 HB, 30 NA, 30 NH, 30 SR, 30 SQ, 30 SM, 12 C, 12 SH, 12 SA, 12 SS; 425/205, 204, 202, 209, 200

[56] References Cited
UNITED STATES PATENTS

| 3,520,027 | 1/1966 | Amos et al................... | 18/30 FM |
| 2,890,491 | 6/1959 | Hendry........................ | 18/30 AM X |
| 2,404,559 | 7/1946 | Ashbaugh.................... | 18/30 FQ X |
| 2,382,655 | 8/1945 | Nichols....................... | 18/30 FH |
| 3,452,398 | 1/1969 | Siegel.......................... | 18/30 SQ |
| 2,102,328 | 12/1937 | Morin et al.................. | 18/30 FS X |
| 3,559,240 | 2/1971 | Kosinsky et al.............. | 18/12 SH |
| 3,452,865 | 7/1969 | Eckhardt..................... | 18/12 SH X |
| 3,583,679 | 6/1971 | Godley........................ | 425/202 |

FOREIGN PATENTS OR APPLICATIONS

| 549,556 | 11/1922 | France........................ | 18/30 NA |

Primary Examiner—J. Spencer Overholser
Assistant Examiner—David S. Safran
Attorney—Richard A. Wise, Richard B. Megley and Vincent A. White

[57] ABSTRACT

A method and apparatus in which dry materials including reinforcing fibers and liquid thermosetting type resin materials are mixed, forming a viscous dough-like mixture which is fed continuously for direct transfer to an injection device having a nozzle through which the mixture is injected into the cavity of a mold for reaction of the mixture to form reinforced plastic articles.

1 Claim, 3 Drawing Figures

Inventors
Marc A. Rizzi
Peter Hold
Dominic A. D'Amato
Dario J. Ramazzotti
By their Attorney
Vincent P. White

APPARATUS FOR INJECTING MOLDING REINFORCED PLASTIC ARTICLES

BACKGROUND OF THE INVENTION

The advantages of reinforcing plastic articles with fibers is well known and manufacture of such reinforced articles is common. One of the best known and most useful fibers used for reinforcement is formed of glass which is especially difficult to handle and mix with plastic materials due to a great extent to the brittleness of glass. For greatest reinforcing quality small bundles of aligned glass fibers must be well dispersed in the article formed with the bundle integrity maintained. While other fibers such as asbestos, sisal and other natural and synthetic fibers may not be quite so subject to breakage as glass, it is essential that such other fibers must also be well dispersed and not be gathered in clumps or the strength of the article formed will be greatly reduced.

Apparatus and methods heretofore used for manufacture of fiber reinforced plastic articles usually require a great deal of manual handling. Since it is essential that the fibers be well dispersed in the plastic forming mixture as well as not being broken into ineffectual short lengths, it is common to mix such fibers with liquid resin materials in batches which can be subject to close quality inspection. This usually results in bulk storage of such batch mixtures such as in drums and, since the mixtures may not be used immediately, certain retardant additives must be included in the mixtures. Such additives clearly affect the reaction of the mixtures when finally molded. It is also common, in the molding of such mixtures, to load mold cavities manually and it is virtually unknown to automatically and continuously feed and injection mold such mixtures with commonly available injection molding equipment. This is principally due to the fact that such fiber reinforced mixtures are highly viscous and dough-like and are difficult to feed automatically without operator intervention.

From the foregoing, it is apparent that the manufacture of molded fiber reinforced thermosetting plastics has involved relatively expensive procedures and that the economic advantages of continuous automatic injection techniques are not available. Accordingly, it is a general object of the invention to provide a method which overcomes the above disadvantages and permits manufacture of fiber reinforced plastic articles according to efficient procedures. To this end, the invention provides a method including the steps of mixing dry materials which include reinforcing fibers with liquid resin materials to form a highly viscous, dough-like mixture in a non-reactive condition; continuously feeding the mixture for direct transfer to the inlet of an injection molding machine; controlling the condition of the mixture in the injection machine to prevent substantial reaction, injecting the mixture through a nozzle into the cavity of a mold, and causing the mixture to react in the cavity to form reinforced plastic articles. Thus, with such a method, it is now possible to mass produce successive fiber reinforced plastic articles starting with the separate ingredients and in a continuous manner proceed to the finished product in a highly efficient and economical manner without substantial manual intervention as heretofore required.

It is further an object of the invention to provide apparatus having a device for mixing dry ingredients, which may include reinforcing fibers, with liquid resin materials into a highly viscous, dough-like mixture. The mixing device includes means for continuously feeding the mixture in a positive manner into an intermittently operated accumulating and transfer device. The transfer device accepts the continuously fed mixture and transfers it directly into the inlet of an intermittently operable injection unit. The injection unit conveys the mixture until a predetermined charge is at a nozzle through which the charge is forcibly injected into the cavity of a mold for reaction to form a reinforced plastic article. The mixture formed, transported and injected is maintained in a substantially non-reactive condition until it actually is contained in the mold cavity. With such an apparatus it is now possible to mold successive reinforced plastic articles of consistent quality in an automated and highly efficient manner.

Figure 1:
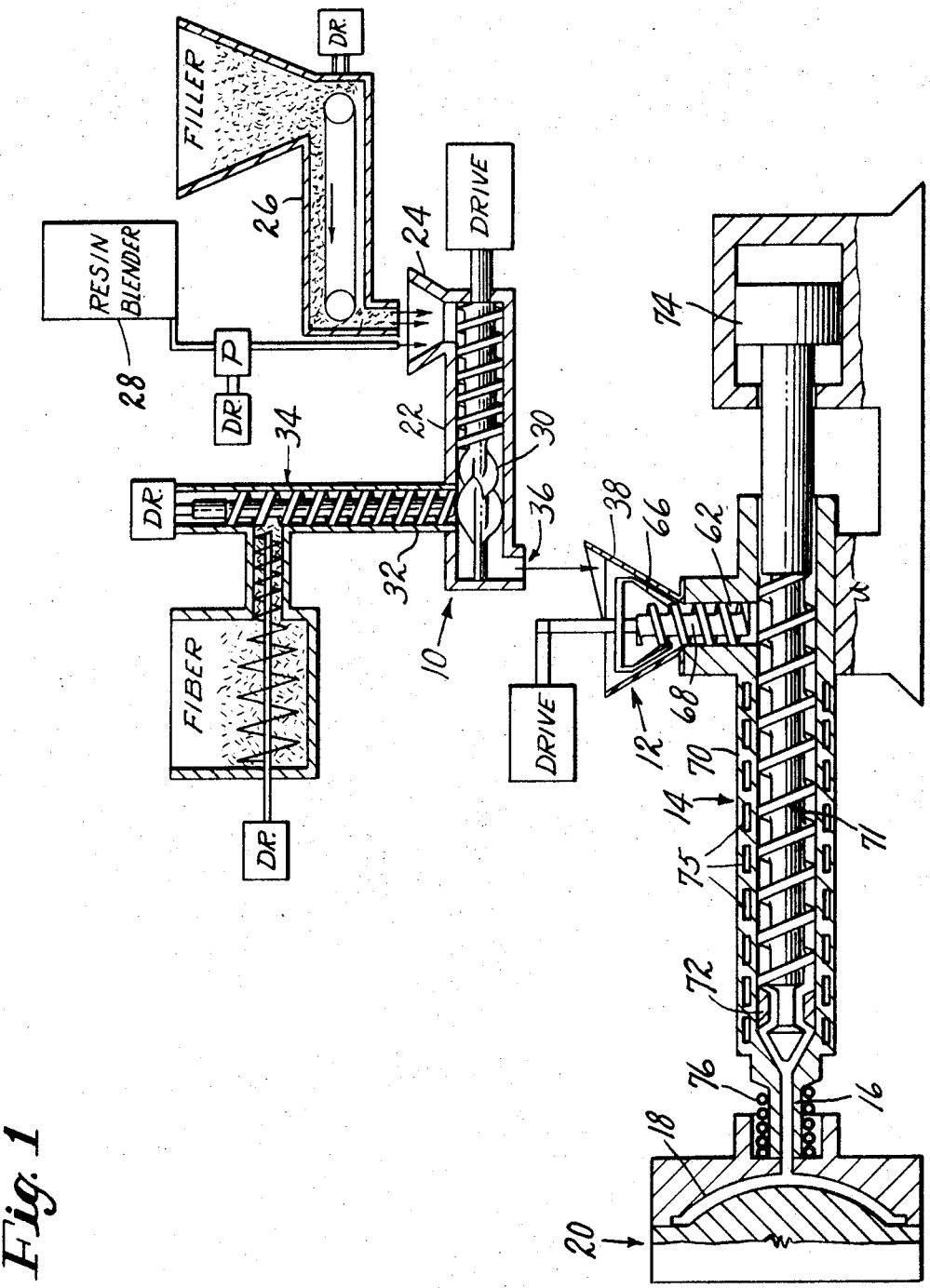
FIG. 1 is a diagrammatic view of apparatus embodying the invention for molding reinforced plastic articles.

There is shown in FIG. 1 apparatus embodying the invention which includes a unit 10 for mixing dry and liquid materials, an accumulating and transfer mechanism 12 into which the mixing unit continuously feeds the mixture, an injection molding machine 14 which intermittently receives the mixture from the transfer mechanism and conveys to and injects the mixture through a nozzle 16 into a cavity 18 of a mold 20. The mixing unit 10 may be of any suitable type such as one of the three types described below, but essentially must be capable of thoroughly wetting and mixing dry materials, including reinforcing fibers, with thermosetting liquid polymers, such as polyester, phenol formaldehyde, urea formaldehyde, melamine formaldehyde, epoxy, and other resins without excessive shearing or mechanical forces being applied such as would tend to break fibers into ineffective short lengths or would tend to raise the temperature of the resin mixture to a condition in which premature reaction would occur. However, to utilize certain resins which may be normally solid or excessively viscous, the mixer unit should be capable of maintaining such resins at temperatures high enough to keep them in a liquid state suitable for mixing and handling but not high enough to cause a thermosetting reaction. Obviously, the term "thermosetting polymers" includes resins which react chemically to convert them to a higher melting point or infusible condition with temperature being only one reactive characteristic involved.

One suitable type of mixing unit 10 is shown diagrammatically in FIG. 1 and includes a body portion 22 having an inlet hopper 24 through which dry materials such as fillers like calcium carbonate, asbestos or clay are deposited from a feed mechanism 26, and liquid resins are pumped from a tank or blending unit 28. The dry and liquid materials are fed through a chamber in the body portion 22 by conveyor screw portions and mixing portions of rotors 30. The rotors provide a mechanical working of the materials which are thoroughly wetted and substantially mixed by the time they pass an inlet 32 through which reinforcing fibers such as of glass may be fed from a unit 34 especially adapted to handle the feeding of such fibers. In this manner, the fibers are introduced to the mixture, which is highly viscous at this point and mixed therewith with a minimum of mechanical working so as to avoid breakage of the fibers. However, reinforcing fibers which are not sensitive to breakage could be introduced at the hopper 24 only. The mixture thus formed is viscous and dough-like and is fed continuously from an outlet 36 into a hopper 38 of the transfer mechanism 12.

Figure 2:
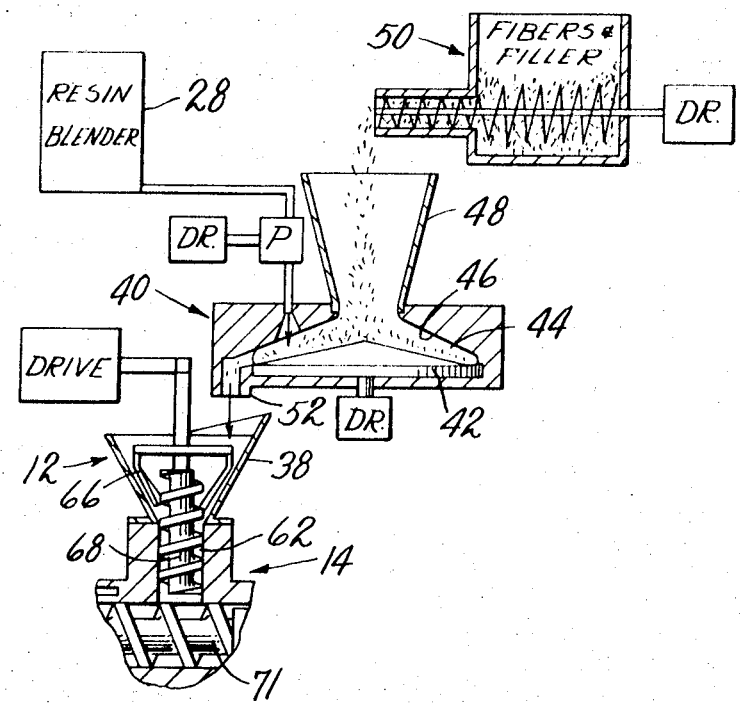
FIG. 2 is a diagrammatic view of an alternate form of a device for mixing dry and liquid materials.

Another suitable type of mixing unit 40 is diagrammatically illustrated in FIG. 2 and includes a rotatable plate 42 having a face forming one side of an annular mixing chamber 44 the other side of which is formed by a fixed surface 46. The unit has a central opening hopper 48 through which the dry materials are fed from a feed unit 50 and deposited on the continuously rotating plate 42. The dry materials are carried outwardly along the face of the plate by centrifugal force. A liquid resin or a blend of liquid resinous materials is pumped from the tank or blender 28 and is sprayed into the chamber 44 to wet the dry materials forming a viscous mixture. The relative motion between the plate and fixed surface causes the mixture to be further mixed by a rolling action which does not tend to break reinforcing fibers which are well dispersed. The mixture is directed continuously through an outlet 52 into the hopper 38 of the transfer mechanism 12. This mixer is the subject of U. S. Pat. No. 3,630,492 and reference may be had thereto if a more detailed description is desired.

Figure 3:
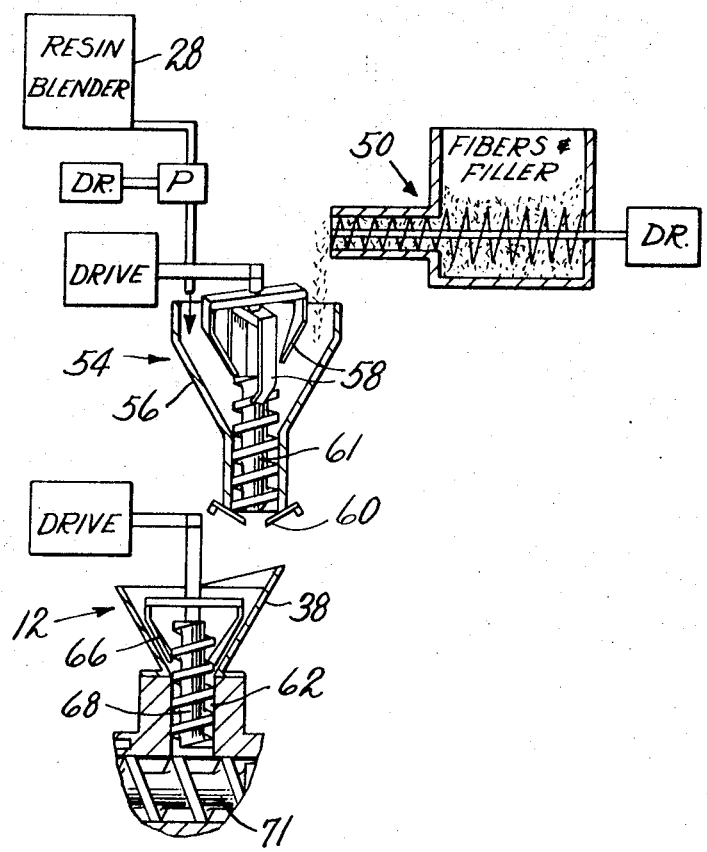
FIG. 3 is a diagrammatic view of another alternate mixing device.

A further type of mixing unit 54 is shown in FIG. 3 and includes a hopper 56 into which the dry and liquid materials are deposited and pumped from a feed unit 50 and a tank or resin blender 28 respectively. The unit is provided with one or more blades 58 which rotate in the hopper to spread or smear the dry and wet materials on the wall of the hopper for thorough wetting. The configuration of the blades spreads the materials in a spiral direction and also causes the wetted and initially mixed materials to roll along the wall spirally both to further mix the materials and to transport the mixture toward an outlet 60 at the lower end of the hopper. The mixer unit is also provided with a screw 61 into which the mixture is rolled for continuous conveyance from the hopper outlet into the transfer mechanism 12. The mixing unit 54 is the subject of commonly owned U. S. application Ser. No. 101,749 filed Dec. 28, 1970 to which reference may be had for additional description, if desired.

All of the above described mixing units have been found to be well suited for use with the remaining parts of the apparatus and in the mixing step of the total method involved. Regardless of which mixer is utilized, a highly viscous, dough-like mixture is continuously fed for transfer directly to an inlet 62 of the injection molding machine. Since the machine shown operates intermittently, as will be described, to inject successive predetermined charges of the mixture into the mold cavity 18, provision is made to intermittently transfer the mixture which is continuously fed from the mixer. To this end, the transfer mechanism includes a conical hopper 38 providing at its wider end a zone for receiving and accumulating the mixture fed from any one of said mixing units, and having blades 66 and a screw 68 which operate in a manner similar to the blades 58 and screw 61 of the alternate form of the mixer unit 54 (FIG. 3). The blades 66 of the transfer mechanism, as shown herein and as described in said application Ser. No. 101,749, converge as they extend toward the narrow end of the hopper. The blades are twisted at their lower end so as to be angularly disposed to the wall and also trail relative to the direction of rotation of the blades so as to roll the previously mixed materials spirally along the transfer hopper wall into the transfer screw 68 which force feeds the mixture into the inlet 62. Such a positive transferring action is generally required since the highly viscous nature of the mixture does not permit it to readily flow and generally the mixture must be transported in a positive manner. Obviously, some other forms of transport mechanisms could be used such as conveyor screws and/or tamping mechanisms. Certainly, if the injection molding machine is operated in a substantially continuous manner then the screw 61 of the mixing unit 54 (FIG. 3) could be used for forced feeding of the viscous mixture without need for a separate transfer mechanism. However, according to a preferred method and use of the apparatus, the injection molding machine is operated intermittently and the hopper 38 of the transfer mechanism 12 forms an accumulating zone for the mixture which is continuously mixed and fed and the blades 66 and screw 68 are rotated only when the injection machine requires the feeding of mixture through the inlet 62.

The injection molding machine 14 shown in FIG. 1 is of a well-known type which includes a barrel portion 70 in which a screw 71 is rotated. As the screw rotates, mixture is fed through the inlet 62 and is transported by the screw 71 to the left, as seen in FIG. 1, past a non-return valve 72 on the end of the screw. When the mixture builds up at the end of the screw, the screw is moved axially to the right until a predetermined volume of mixture is contained between the end of the screw and the nozzle 16. The rotation of the screw 71 is then stopped along with rotation of the transfer screw 68 and a piston 74 at the other end of the screw 71 is forced to the left to inject the mixture through the nozzle and into the mold cavity 18. The method and the apparatus described are most ideally suited for use with thermosetting resin mixtures and care is taken through the mixing and transferring steps to maintain the mixture at temperatures and conditions below the thermosetting reactive state. The mode of operation of both the mixing unit and the transferring mechanism is such that the temperature of the mixture would not be changed to any great extent so that the resin involved is maintained in a liquid state. However, if desirable, it is within the scope of the invention to apply a heat transfer medium to either or both devices. The injection screw 71 is constructed with deep flights to provide a conveying function only without substantial mechanical working such as would tend to substantially change the temperature of the mixture or degrade the fibers. To ensure that the mixture temperature is held at a substantially non-reactive level, the barrel 70 is provided with channels 75 through which a heat transfer medium may be circulated. In addition, the screw 71 may also be provided with heat transfer channels such as is well known in the art. The mixture may be injected into the mold cavity through a sprue or runner system, or the nozzle 16 may be elongated so as to extend into the mold to the cavity 18 and may also be provided with channels or coils 76 for a heat transfer medium. In this manner, it is insured that the mixture will be maintained in a substantially non-reactive condition until it is actually injected into the mold cavity 18. Once in the cavity, the mixture is quickly brought to a reactive state such as by heating the body 20 so the mixture reacts and forms a solid plastic article. After the article has sufficiently solidified, the mold is opened and the article is removed from the cavity according to techniques well known in the art.

The above described method and apparatus have been successfully used to mix dry ingredients such as calcium carbonate filler and glass fibers at least one-quarter inch in length with a liquid resin such as polyester as well as other additives such as lubricants and catalysts and to transfer and injection mold such mixtures forming solid plastic articles efficiently. By way of example, such a mixture typically included approximately 45 percent powders, 20 percent glass fibers and 35 percent liquid resin. Obviously, such ratios can vary considerably according to the materials involved and the characteristics desired in the article produced. The articles molded have demonstrated very good physical property retention by laboratory testing. In addition, articles so molded have been burned to eliminate the resin and expose the reinforcing fibers which demonstrated that a large proportion of the original glass fiber bundles were intact in their original lengths.

It should be apparent from the foregoing description that equivalent substitutions of various mechanisms may be made for those described, as generally indicated in the description of each unit, without departing from the scope of the invention. While the injection molding machine described is of the well known reciprocating screw type, it should be apparent that other well known injection devices not using reciprocating screws could be substituted also without departing from the scope of the invention defined by the following claims.

Having thus disclosed my invention what I claim as new and desire to secure by Letters Patent of the United States is:

1. In combination with apparatus for molding plastic articles from a viscous mixture which resists transport, said apparatus having an inlet and means for forcibly feeding the mixture intermittently from the inlet into a mold in which the articles are formed; a mixing device for continuously receiving separately fed dry materials and liquid materials and having means for mixing the materials to form said mixture, and means for continuously and forcibly feeding said mixture from an outlet; and a transport device including a conical hopper having a zone at its wider end for receiving and accumulating said mixture fed continuously from the outlet of the mixing device, screw means for intermittently forcing the mixture from the other end of the hopper through the inlet of the molding apparatus, and blade means rotatable coaxially about and converging toward said screw means, said blade means also being twisted so as to be angularly disposed to the wall of the hopper and trailing relative to the direction of rotation for rolling said mixture from said zone spirally along the hopper wall into said screw means.

* * * * *